United States Patent [19]

Tusting

[11] Patent Number: 5,046,259
[45] Date of Patent: Sep. 10, 1991

[54] UNDERWATER MEASURING SYSTEMS AND METHODS

[75] Inventor: Robert F. Tusting, Ft. Pierce, Fla.

[73] Assignee: Harbor Branch Oceanographic Institution, Inc., Ft. Pierce, Fla.

[21] Appl. No.: 522,638

[22] Filed: May 14, 1990

[51] Int. Cl.$^5$ .............................................. G01C 3/14
[52] U.S. Cl. ...................................... 33/272; 33/278; 33/280; 33/284; 33/DIG. 21; 356/1
[58] Field of Search .................. 33/227, 272, 275 R, 33/275 G, 278, 279, 280, 281, DIG. 21, 1 H, 1 T, 1 MP, 284, DIG. 21; 356/1, 4

[56] References Cited

U.S. PATENT DOCUMENTS

| | | | |
|---|---|---|---|
| 3,202,040 | 8/1965 | Burkhart | 356/1 |
| 3,633,010 | 1/1972 | Svetlichny | 356/4 |
| 3,775,735 | 11/1973 | Funk et al. | 356/4 |
| 4,109,391 | 8/1978 | Wing | 33/275 G |
| 4,249,314 | 2/1981 | Beck | 33/1 CC |
| 4,419,731 | 12/1983 | Puffett | 356/4 |
| 4,459,758 | 7/1984 | Halle | 33/274 |
| 4,538,907 | 9/1985 | Rocchi | 356/1 |
| 4,691,446 | 9/1987 | Pitches et al. | 356/1 |
| 4,703,563 | 11/1987 | Hoshino et al. | 33/DIG. 21 |
| 4,981,353 | 1/1991 | Murakawa et al. | 356/1 |
| 5,008,543 | 4/1991 | Bertrand et al. | 356/1 X |

FOREIGN PATENT DOCUMENTS 2377026  9/1978  France ........................... 33/DIG. 21

Primary Examiner—Allan N. Shoap
Assistant Examiner—Alvin Wirthlin
Attorney, Agent, or Firm—Carroll F. Palmer

[57] ABSTRACT

Measuring systems for making underwater measurements of relative positions and distances between a plurality of objects positioned on an ocean or lake floor basically include (a) at least one laser or other light source capable of projecting a collimated light beam therefrom, (b) a pan and tilt unit for moving the source light beam both angularly in vertical planes and in horizontal arcs, (c) a protractor or equivalent for measuring vertical angles through which the longitudinal axis of the light beam is moved by the pan and tilt unit, and (d) a compass unit for determining bearings of vertical plane positions of the light beam relative to magnetic or true north or other azimuth position. The system may include a plurality of lasers and a variety of methods of making measurements with both single and plural laser containing systems are disclosed.

4 Claims, 3 Drawing Sheets

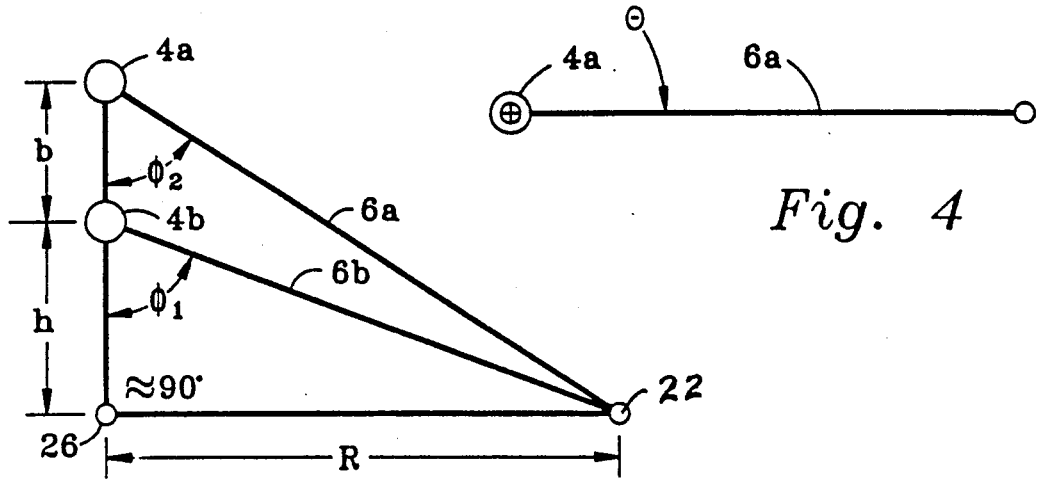
Fig. 4
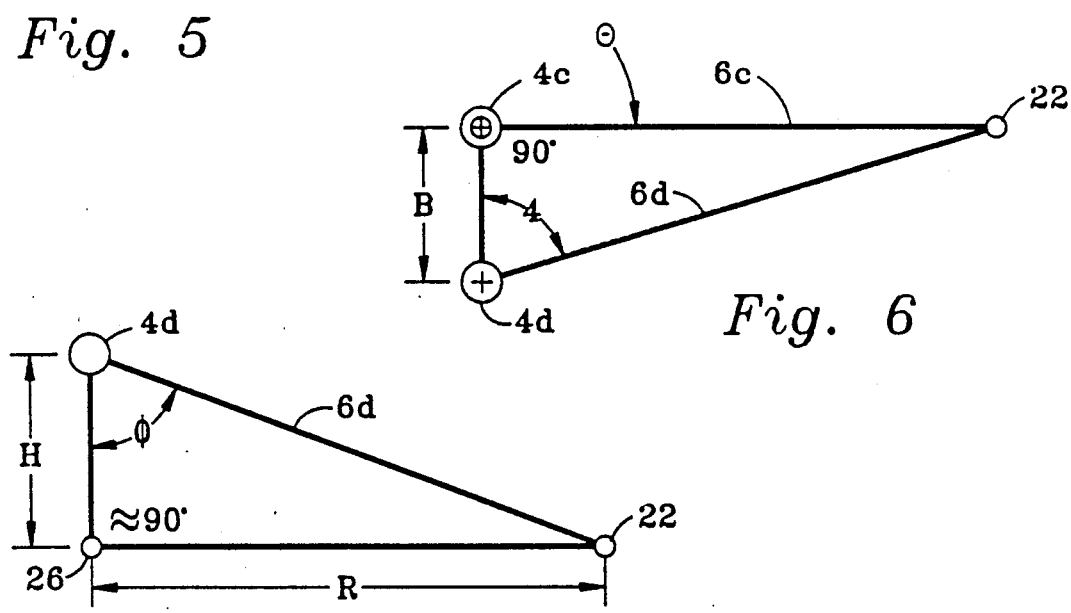
Fig. 5
Fig. 6
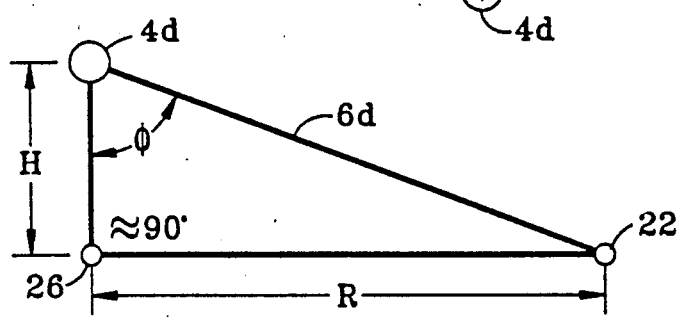
Fig. 7
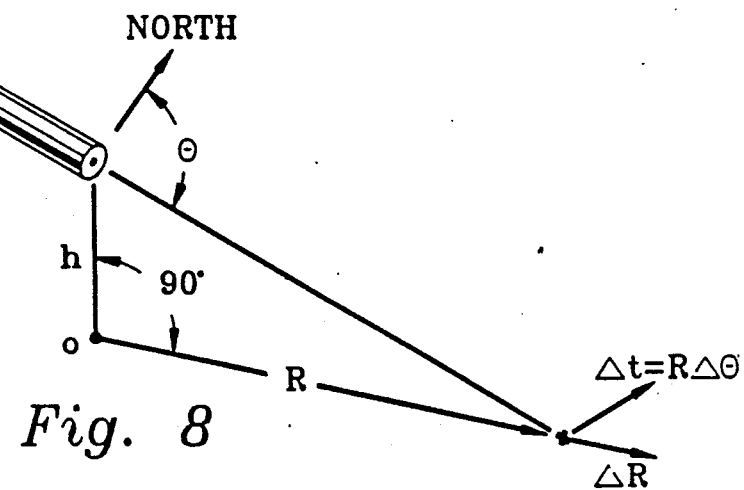
Fig. 8

UNDERWATER MEASURING SYSTEMS AND METHODS

BACKGROUND OF THE INVENTION

1. Field of the Invention

This application relates to underwater measuring systems and methods. More particularly, it concerns near-field distance and position measuring systems and methods for use on submarine vessels engaged in undersea exploration, charting and like activities.

2. Description of the Prior Art

Many scientific and other type operations involving submarine vehicles require measurement of distance between two or more points or objects on a lake or ocean floor. Such operations can also require determination and recording of the relative positions of points or objects on a lake or ocean floor. For example, the location of core samples around a central sampling site is important to tracer studies and the determination of spatial heterogenosity. Also, underwater biological studies often require similar measurements to quantity spatial distributions of habitat and permit analysis of density and dispersion with nearest neighbor statistics. Hence, a need exists for non-intrusive systems and methods that can quickly make underwater, near range distance and position determinations with a reasonable degree of accuracy.

For the sake of brevity in disclosing and claiming the new systems and methods of the invention, in all the text that follows, the terms object or objects should be understood to include the terms point or points where the context would so indicate.

The typical manner of making measurements of the type discussed above has involved the combined use of a bearing compass and an optical range finder. The accuracy of such an approach when used in submarine vessels is poor to unacceptable. Thus, with underwater measurement systems and methods available heretofore, points separated by distances ranging from 2 to 10 meters can not be accurately measured. Many projects requiring accurate measurement of points within this range have depended upon rough estimations by the persons operating within the submersible.

Historically, telescopes have been used in combination with other items, e.g., gyros, theodolites, etc., to operate in a non-intrusive manner to determine azimuth position, alignment or like data relative to a remote object (see U.S. Pat. No. 3,936,947). More recently, collimated light beams from lasers have been used in similar manner to telescopes for like purposes in making angular, height, location or like determinations of remote objects (see U.S. Pat. Nos. 4,160,285; 4,227,776; 4,459,758 and 4,703,563). The present invention utilizes laser beams in new non-intrusive systems and methods that can quickly make distance and position measurements of submarine objects with an acceptable degree of accuracy.

OBJECTS

A principal object of the invention is the provision of improved underwater distance and/or position measuring systems and methods.

Other objects include the provision of:

1. Near-field distance measuring systems and methods for use on submarine vessels engaged in undersea exploration, charting and like activities.

2. Such measuring systems and methods that permit making the desired measurements without disturbing the objects of interest or their surrounding, i.e., non-intrusive operation.

3. Such measurement systems and methods that permit accuracy within 10 cm over a 5 m distance between objects within the visual field permitted by the submersible, its lights and water clarity.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished in accordance with the invention by the provision of an underwater measuring system that basically comprises (a) at least one source capable of projecting a collimated light beam therefrom, (b) pan and tilt means for moving the source light beam both angularly in vertical planes and in horizontal arcs, (c) protractor means for measuring angles through which the longitudinal axis of the light beam is moved by the pan and tilt means, and (d) compass means for determining bearings of vertical plane positions of the light beam relative to magnetic or true north or other azimuth position.

In preferred embodiments, the light source is a laser and there can be a plurality of them. Also, the compass means may be a magnetic compass, a gyro compass or a flux gate compass and the protractor means may be an electronic protractor.

Submarine vessels in accordance with the invention typically have the new measuring systems mounted thereon for projection of the light beam forward thereof in an arc of up to 270°, but mounting arrangements allowing for rearward or 360° projection may be used.

A first embodiment of the new measuring systems comprises a laser capable of projecting a collimated light beam therefrom, pan and tilt means supporting the laser for movement of the laser light beam both angularly in vertical planes and in horizontal arcs, a protractor for measuring vertical angles through which the longitudinal axis of the light beam is moved by the pan and tilt means and compass means for determining bearings of vertical plane positions of the light beam relative to magnetic north or other azimuth position.

A second embodiment of the measuring systems comprises first and second lasers each capable of projecting a collimated light beam therefrom, pan and tilt means mounting the first and second lasers with the first laser spaced vertically above the second laser for moving the lasers individually angularly in vertical planes and swinging both simultaneously in horizontal arcs, a first protractor for measuring vertical angles through which the longitudinal axis of the light beam of the first laser is moved by the pan and tilt means, a second protractor for measuring vertical angles through which the longitudinal axis of the light beam of the second laser is moved by the pan and tilt means and compass means for determining bearings of vertical plane positions of the first or second laser relative to magnetic north or other azimuth position. This system may include means to change the distance of vertical separation of the first and second lasers.

A third embodiment of the measuring systems comprises first and second lasers each capable of projecting a collimated light beam therefrom, such lasers being spaced apart from each other in a common horizontal plane, first pan and tilt means mounting the first laser for moving its longitudinal axis angularly in a vertical plane that bears 90° to the vertical plane containing both the first and second lasers and swinging it in horizontal arcs, second pan and tilt means mounting the second laser for moving the second laser angularly in vertical planes and swinging it in horizontal arcs, a first protractor for measuring vertical angles through which the longitudinal axis of the first laser is moved by its pan and tilt means, a second protractor for measuring vertical angles through which the longitudinal axis of the second laser is moved and horizontal angles through which the longitudinal axis of the second laser is swung by the pan and tilt means, and compass means for determining bearings of vertical plane positions of the first laser relative to magnetic north or other azimuth position. This system may include means to change to distance of horizontal separation of the first and second lasers.

The new methods of the invention basically comprise aiming a collimated light beam projected from a laser located a known distance above the floor of a lake or ocean at an object of interest positioned on such floor, measuring the angular inclination of said light beam from the horizontal when aimed at such object, determining the angle of the vertical plane of the longitudinal axis of the light beam relative to a known azimuth point and calculating the position of the object with respect to the plumb point beneath the laser on such floor. The light beam is re-aimed at other objects and their positions are sequentially determined in like manner. A vision system, i.e., a local observer, a video camera or equivalent imaging system, is needed to aim the light beam. The recording of data can be done remotely or on board the submarine vessel.

In the second embodiment of the new measuring systems, the vertical tilt angle of each of the two lasers needs to be controlled and measured and the bearing of one of the laser beams relative to an azimuth point must be measured.

In the third embodiment, the bearing of the first laser beam relative to an azimuth point must be measured and the vertical tilt angle of each of the two laser beams must be measured.

Basically, the method for making underwater measurements of relative positions of objects and distances between objects positioned on the floor of an ocean or lake floor in accordance with the invention comprises projecting at least one collimated light beam from a laser or other source thereof from a location at a known height above such floor, moving the light beam both angularly in a vertical plane and in a horizontal arc to a first position wherein it illuminates a first of the objects, measuring the vertical inclination relative to the horizontal of the longitudinal axis of the light beam in the first position, determining the bearing of the vertical plane position of the light beam in the first position relative to magnetic north or other azimuth position, moving the light beam both angularly in a vertical plane and in a horizontal arc to at least a second position wherein it illuminates a second of the objects, measuring the vertical inclination of the longitudinal axis of the light beam in the second position, determining the bearing of the vertical plane position of the light beam in the second position relative to magnetic north or other azimuth position. The steps of light beam movements with angle and bearing determinations are repeated as many times as required to cover all objects of interest within view.

The methods of the invention may employ a plurality of laser beams rather than a single beam. In one method using a pair of lasers for making underwater measurements of relative positions of objects and distances between objects positioned on the floor of an ocean or lake floor, collimated light beams are projected from first and second lasers spaced vertically one above the other in a common vertical plane, each laser being at a location of known height above such floor. The light beams from both lasers are moved simultaneously in a horizontal arc and individually angularly in a common vertical plane to a first position wherein the beams illuminate a first of the objects. At such first position, the vertical inclinations relative to the horizontal of the longitudinal axis of each of the light beams is measured and the bearing of the vertical plane position of the light beams in the first position relative to magnetic north or other azimuth position is determined. The light beams are then moved angularly in a vertical plane and in a horizontal arc to at least a second position wherein they illuminate a second of the objects, the vertical inclinations of the longitudinal axis of the light beams in the second position are measured and the bearing of the vertical plane position of the light beams in the second position relative to magnetic north or other azimuth position is determined. In this type method, the distance of vertical separation of the first and second lasers may be varied to accomodate circumstance existing at the site of measurements.

In another method using a pair of lasers for making underwater measurements of relative positions of objects and distances between objects positioned on the floor of an ocean or lake floor, collimated light beams are projected from first and second lasers spaced apart horizontally a known distance from one in a common horizontal plane, each laser being at a location of known height above such floor. The light beam from the first laser is moved in a horizontal arc and angularly in vertical plane that is normal to the aforesaid common horizontal plane to its first position wherein the beam illuminates a first of the objects. Also, the light beam from the second laser is moved in a horizontal arc and angularly in vertical plane to its first position wherein such also beam illuminates the first of the objects. At such first positions, the vertical inclinations relative to the horizontal of the longitudinal axis of each of the light beams is measured and the bearing of the vertical plane position of the light beam of the first laser in its first position relative to magnetic north or other azimuth position is determined. The light beams are then moved angularly in a vertical plane and in a horizontal arc to at least a second position wherein they illuminate a second of the objects, the vertical inclinations of the longitudinal axis of the light beams in the second position are measured and the bearing of the vertical plane position of the first laser light beam in the second position relative to magnetic north or other azimuth position is determined. In this type method, the distance of horizontal separation of the first and second lasers may be varied to accomodate circumstances existing at the site of measurements.

BRIEF DESCRIPTION OF THE DRAWINGS

A more complete understanding of the invention can be obtained by reference to the accompanying drawings in which:

FIG. 4 is a diagrammatic plan view of a second embodiment of an underwater measuring system of the invention.

FIG. 5 is a diagrammatic lateral view of a second embodiment of an underwater measuring system of the invention.

FIG. 6 is a diagrammatic plan view of a third embodiment of an underwater measuring system of the invention.

FIG. 7 is a diagrammatic lateral view of a third embodiment of an underwater measuring system of the invention.

FIG. 8 is a diagrammatic isometric view of a laser aimed in accordance with the invention at an underwater object.

DESCRIPTION OF THE PREFERRED EMBODIMENTS

Figure 1:
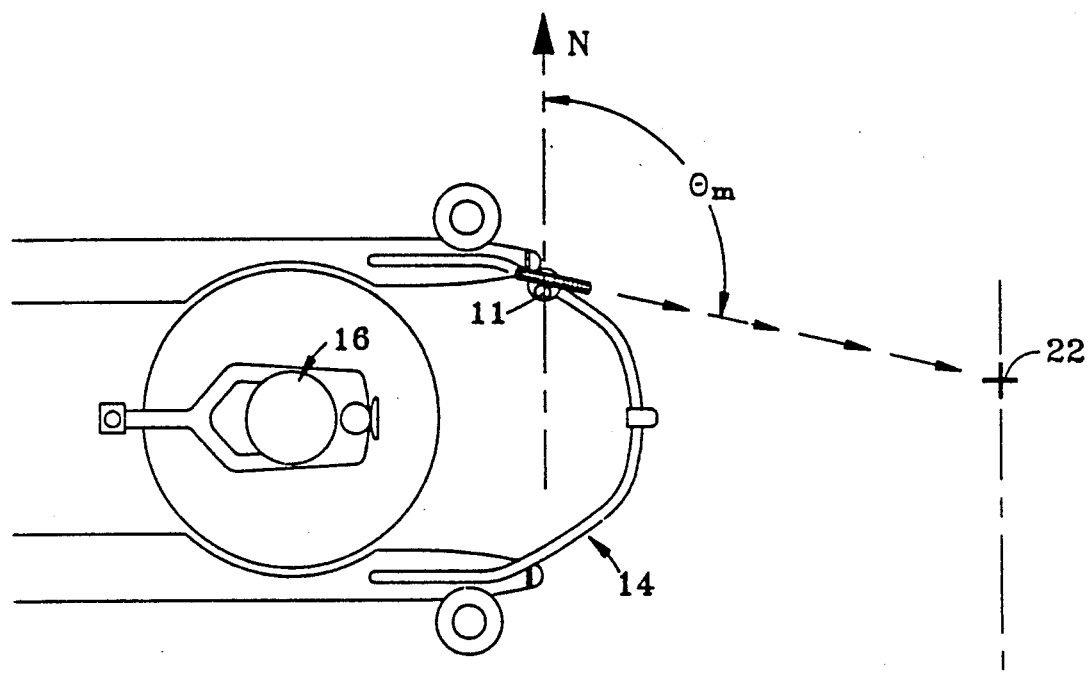
FIG. 1 is a plan view of a submarine vessel equipped with one embodiment of an underwater measuring system of the invention.
Figure 2:
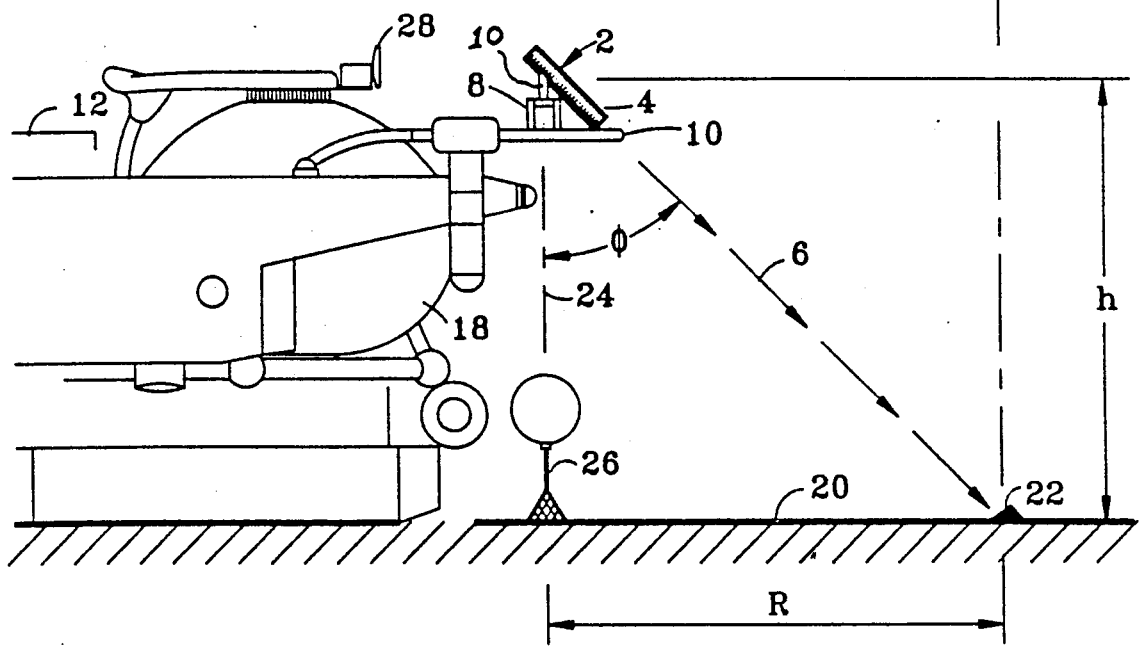
FIG. 2 is a lateral view of the vessel of FIG. 1.
Figure 3:
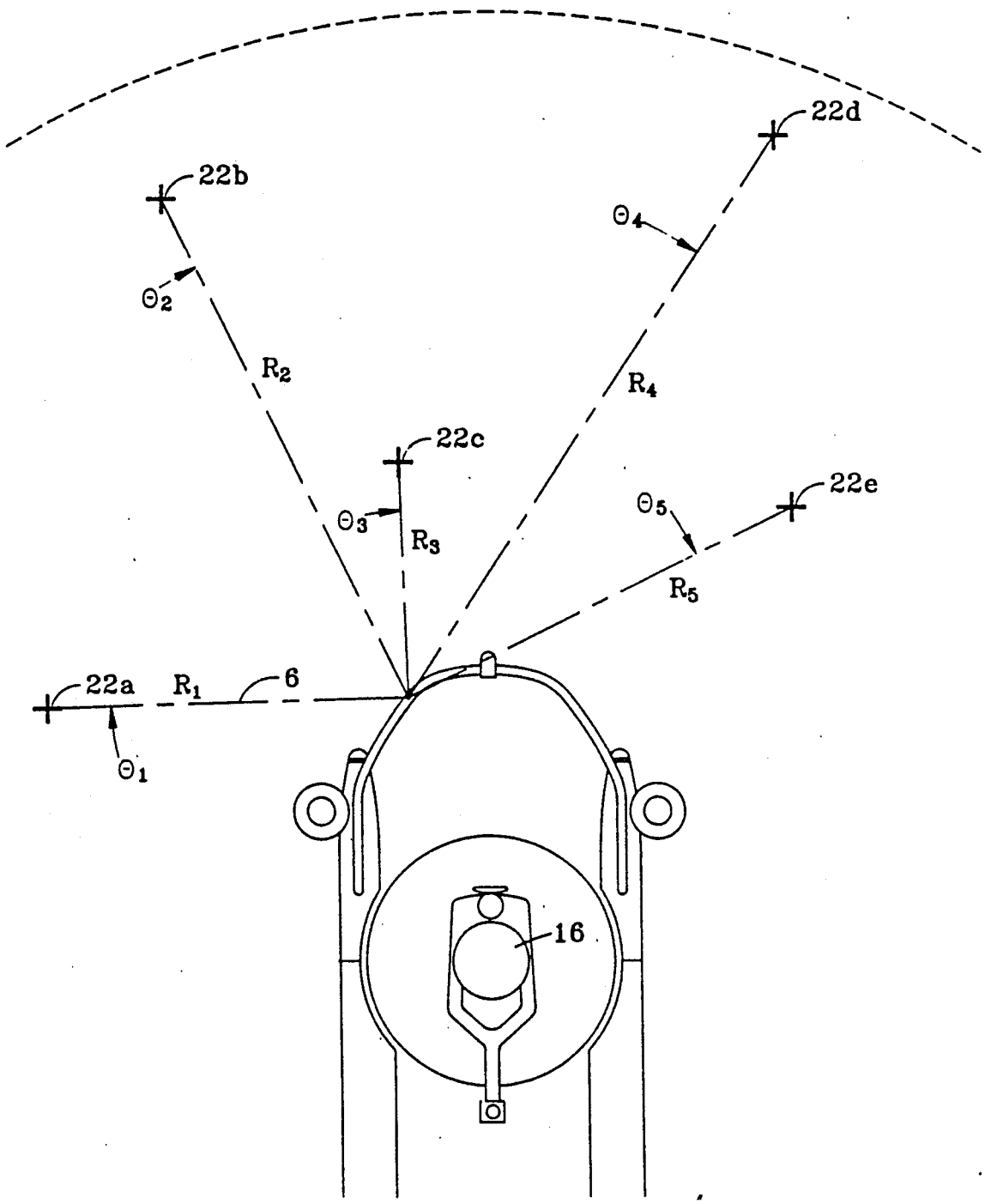
FIG. 3 is a explanatory plan view involving the vessel of FIG. 1.

Referring in detail to FIGS. 1-3 of the drawings, in a first embodiment of the invention, the underwater measuring system 2 comprises a laser 4 capable of projecting a collimated light beam 6 therefrom, pan and tilt means 8 for moving the light beam 6 both angularly in vertical planes and in horizontal arcs, protractor means 10 for measuring angles through which the longitudinal axis of the light beam is moved by the pan and tilt means, and compass means 11 for determining bearings of vertical plane positions of the light beam 6 relative to magnetic north or other azimuth position.

The measuring system is mounted on the submarine vessel 12 by support equipment 14 so that the light beam 6 projects forward of the vessel 12 permitting an operator 16 in the observation bubble 18 to view movement of the beam 6 over the ocean or lake floor 20 to an object 22.

FIG. 3 illustrates making position determinations in accordance with the invention of multiple objects 22a, 22b, 22c, 22d and 22e.

During the taking of measurements with the system 2, the vessel 12 remains stationary so that the plumb line 24 from the center of rotation of the pan and tilt means 8 intersects a point 26 on the floor 20. The point 26 may be some pre-existing object or a marker device as shown in FIG. 2 placed by the vessel 12. Positions of objects 22a-e measured with system 2 at a particular location will be recorded relative to the object 26.

In making a relative position measurement of the object 22 (see FIGS. 4 & 6), the bearing $\theta$ of the longitudinal axis of the laser beam 6 relative an know azimuth position, e.g., magnetic north is determined. Also determined is the laser beam's inclination angle $\phi$ and the height h between the floor 20 and the pivot point of the laser 4, typically about 4 meters. With this data, the position of object 22 can be determined with respect to plumbline benchmark 26.

The range is given by: $R = h \tan \phi$  $0 \leq \phi \leq 90°$ and the bearing is given by: $\theta$  $0 \leq \theta \leq 359°$.

Advantageously, the benchmark object 26 can be an active/passive acoustic beacon to allow absolute measurement of its position with respect to other benchmarks or bottom features using the submarine vessel's sonar or a shipboard high-precision acoustic navigation system.

With the submersible 12 in static position above the floor 20, an on-board operator 16 can observe a number of objects 22a-e within the field-of-view and sequentially measure the position of each of them as idealy illustrated by FIG. 3. Thus, the operator 16 first aims the laser beam 6 at object 22a using pan and tilt means 8 and records the bearing $\theta_1$ and tilt angle $\phi_1$ for object 22a. The operator then remains the laser beam 6 seriatim onto objects 22b-e and repeats the recording of bearing angles $\theta_{2-5}$ and tilt angles $\phi_{2-5}$. Reduction of the recorded tilt angles to obtain ranges $R_{1-5}$ can be accomplished in suitable manner thereafter, e.g., at the conclusion of the dive with the submersible 12.

A second embodiment of the new measuring systems is diagramatically shown in FIGS. 4 & 5 comprises a pair of lasers 4a and 4b, capable of projecting collimated light beams 6a and 6b therefrom. As in the case of the first embodiment each laser would be mounted by pan and tilt means (not shown) for moving the lasers individually angularly in vertical planes and swinging both simultaneously in horizontal arcs with laser 4a spaced vertically above the laser 4b a distance b. Also, as in the first embodiment, each laser 4a and 4b is provided with a protractor (not shown) for measuring vertical angles through which the longitudinal axis of their light beams are moved by the respective pan and tilt means and compass means (not shown) for determining bearings of vertical plane positions of the first and second lasers relative to magnetic north or other azimuth position. This system may include means (not shown) to change the distance b.

A third embodiment of the new measuring systems is diagramatically shown in FIGS. 6 & 7 comprises a pair of lasers 4c and 4d, capable of projecting collimated light beams 6c and 6d therefrom. As in the case of the first embodiment each laser would be mounted by pan and tilt means (not shown) for moving the lasers individually angularly in vertical planes and swinging both individually in horizontal arcs with laser 4c spaced horizontally from the laser 4b a distance B. Also, as in the first embodiment, each laser 4c and 4d is provided with a protractor (not shown) for measuring vertical angles through which the longitudinal axis of their light beams are moved by the respective pan and tilt means and laser 4c has compass means (not shown) for determining its bearing relative to magnetic north or other azimuth position. This system may include means (not shown) to change the distance B.

Since FIGS. 4-7 are diagrammatic in nature, it will be understood by those skilled in the art that the separate lasers 4a, 4b, 4c & 4d, while not shown in the FIGS. 4-7, will each have associated therewith pan and tilt means, such as means 8, and protractor means, such as means 10, in FIG. 2.

In constructing a system of the invention, the lasers used should be sufficiently collimated and intense to allow measurements to be made for a range within the visual limitations of the water. A maximum useful range of 10 meters in clear water is desired. A preferred laser is 1.5 mW green hene laser because of the nearly optimum match of its emission wavelength (543.5 nm) to the transmission "window" of water and its low beam divergence. In addition, the sensitivity of the human eye to green light is much higher than it is for longer wavelength light, especially for scotopic or low light conditions.

The pan and tilt means (PTM) may take a variety of shapes and forms, but should be constructed of essentially non-magnetic material so as not to interfer with the operation of the compass means. PTM made with conventional electric motors are not acceptable due to the relatively large stray magnetic fields and the necessary inclusion of ferromagnetic materials. Hence, fluid motors and drives are advantageous for construction of the PTM.

The new measurement systems are typically mounted near the front of the submarine vessel, as high as practical to maximize the measurement accuracy and at a location with little or no adjacent ferromagnetic material and minimum stray magnetic fields, e.g., away from thrusters, arc lights and like equipment conventional on submersibles.

For the purpose of estimating measurement accuracy, the datum point of the benchmark is assumed to be a point on the bottom directly beneath the PTM as shown in FIG. 2.

Errors in position measurement in accordance with the invention can result from error in any of several variables, e.g., the degree to which the floor 20 varies from an ideal flat horizontal surface.

Using a polar coordinate system, it is convenient to separate the radial position error $\Delta R$ from the transverse positional error $\Delta t$. Assuming the floor to be flat and horizontal and with reference to FIG. 8, the uncertainty (error) in the transverse position determination is given by: $\Delta t = R\Delta\theta$, where $\Delta\theta$ is the uncertainty in measurement of bearing angle $\theta$. The uncertainty in range R, i.e. $\Delta R$, is approximately given by: $\Delta R \approx h(\tan\Delta\phi)(1+\tan^2\theta)$, where h=the height of the laser 4 above the bottom, $\phi$=tilt angle and $\Delta\phi$=uncertainty in measuring the tilt angle.

The last equation shows that $\Delta R$ is a strong function of the tilt angle for the large values thereof (approaching 90°), a linear function of the height h and an essentially linear function of $\Delta\phi$ since $\Delta\phi$ will be a small angle for any useful tilt angle sensor. It is apparent too for long-range use, e.g., where $\phi > 60°$, a precise angular measurement of $\phi$ is essential. Increasing the height h, if feasible, will reduce the error at long range, but would result in increasing error for short range measurements.

Predicted error in the measured position of an object in accordance with the invention can be calculated for expected errors in the two angular values. Thus, assume $\Delta\theta = 1° = 0.0175$ radian, $\Delta\phi = 0.5° = 0.0087$ radian, and h=4 meters.

For this case, $\Delta t$ and $\Delta R$ can be estimated as a function of range R.

The error $\Delta t$ increases linearly with range, but the error $\Delta R$ increases more rapidly for ranges in excess of 5 meters. If the two errors $\Delta t$ and $\Delta R$ are independent (a reasonable assumption) the position error $\Delta P$ can be estimated from:

$$\Delta P \approx \sqrt{\Delta R^2 + \Delta t^2}.$$

A reduction in measurement error, especially for long range use (R>5 m) requires improved accuracy and angle measurements, e.g., use of precision inclinometers and compasses.

An additional measurement error will result if the floor of the lake or ocean is not horizontal. The radial measurement error due to sloping of the bottom can be estimated from: $\Delta R_s = h \sin\phi [1/\cos\phi - 1/\cos(\phi - \alpha)]$, where h and $\phi$ are defined as before and $\alpha$ is the angle of slope in degrees in the direction of the measured object.

The predicted error in measured position can be calculated as a function of range R and bottom slope $\alpha$. For example if $\alpha = 5°$, then $\Delta R_s$ can be estimated as a function of range. It can be shown by calculation examples that the measurement error due to a sloping bottom can be significant for longer range measurements, e.g., >5 meters. However, this error is not random and a correction can be made if the bottom slope can be measured or estimated. Also, the error in measuring the distance to a pair of closely-spaced objects will have a consistent bias, so the error in measuring the differential distance will be small.

The embodiments of the invention in which an exclusive property or privilege is claimed are defined as follows:

1. A submarine vessel having mounted thereon an underwater measuring system comprising:
   first and second lasers,
   pan and tilt means mounting said first and second lasers with said first laser spaced vertically above said second laser for moving said lasers individually angularly in vertical planes and swinging both simultaneously in horizontal arcs,
   a first protractor for measuring vertical angles through which the longitudinal axis of said first laser is moved by said pan and tilt means,
   a second protractor for measuring vertical angles through which the longitudinal axis of said second laser is moved by said pan and tilt means, and
   compass means for determining bearings of vertical plane positions of at least said first laser relative to magnetic north or other azimuth position.

2. A submarine vessel having mounted thereon an underwater measuring system comprising:
   first and second lasers spaced apart from each other in a common horizontal plane,
   first pan and tilt means mounting said first laser for moving its longitudinal axis angularly in a vertical plane that bears 90° to the horizontal plane containing both said first and second lasers,
   second pan and tilt means mounting said second laser for moving it angularly in vertical planes and swinging it in horizontal arcs,
   a first protractor for measuring vertical angles through which the longitudinal axis of said first laser is moved by said pan and tilt means,
   a second protractor for measuring vertical angles through which the longitudinal axis of said second laser is moved and horizontal angles through which the longitudinal axis of said second laser is swung by said pan and tilt means, and
   compass means for determining bearings of vertical plane positions of the longitudinal axis of said first laser relative to magnetic north or other azimuth position.

3. A method for making underwater measurements of relative positions of objects positioned on an ocean or lake floor which comprises:
   projecting a pair of collimated light beams from first and second lasers spaced vertically one above the other in a common vertical plane, each laser being at a location of known height above such floor, moving said light beams from both lasers simultaneously in a horizontal arc to a first position and individually angularly in a common vertical plane at said first position so that the beams illuminate a first of said objects, measuring at said first position the vertical inclinations relative to the horizontal of the longitudinal axis of each of said light beams and determining the bearing of the vertical plane position of the light beams in the first position relative to magnetic north or other azimuth position, moving said light beams angularly in a vertical plane and in a horizontal arc to at least a second position wherein they illuminate a second of said objects, and measuring the vertical inclinations of the longitudinal axis of said light beams in said second position and determining the bearing of the vertical plane position of said light beams in said second position relative to magnetic north or other azimuth position.

4. A method for making underwater measurements of relative positions of objects positioned on an ocean or lake floor which comprises:

projecting collimated light beams from first and second lasers spaced horizontally a known distance apart in a common horizontal plane, each laser being a known height above said floor, moving the light beam from the first laser in a horizontal arc and angularly in a vertical plane that is normal to said common horizontal plane to a first position wherein said beam illuminates a first of said objects, moving the light beam from the second laser in a horizontal arc and angularly in a vertical plane to a second position wherein said beam from said second laser illuminates said first object, measuring at said first and second positions the vertical inclinations relative to the horizontal of the longitudinal axis of each of said first and second light beams, determining the bearing of the vertical plane location of said first light beam in its said first position relative to magnetic north or other azimuth position, similarly moving said light beams angularly in vertical planes and in horizontal arcs to other positions wherein they each illuminate the same object of other of said objects, measuring the vertical inclinations of the longitudinal axis of said light beams in said other positions, and determining the bearing of the vertical plane location of the first laser light beam in each of said other positions relative to magnetic north or other azimuth position.

* * * * *